(12) United States Patent  (10) Patent No.: US 7,543,600 B2
Berggren et al.  (45) Date of Patent: *__Jun. 9, 2009__

(54) ARRANGEMENT FOR MIXING A FIRST AND SECOND GAS FLOW WITH DOWNSTREAM CONTROL

(75) Inventors: Gustav Berggren, Stockholm (SE); Thomas Holm, Knivsta (SE); Carl-Adam Torbjornsson, Linkoping (SE); Hans Welin, Sankt Ibb (SE); Roland Wangelin, Vange (SE)

(73) Assignee: Varivent Innovations AB (SE)

( * ) Notice: Subject to any disclaimer, the term of this patent is extended or adjusted under 35 U.S.C. 154(b) by 256 days.

This patent is subject to a terminal disclaimer.

(21) Appl. No.: 11/288,572

(22) Filed: Nov. 29, 2005

(65) Prior Publication Data

US 2006/0180224 A1  Aug. 17, 2006

Related U.S. Application Data

(63) Continuation-in-part of application No. 10/363,350, filed on Jul. 7, 2003, now Pat. No. 7,036,529.

(51) Int. Cl.
 *G05D 11/02* (2006.01)
(52) U.S. Cl. .................. 137/219; 123/568.17; 137/892
(58) Field of Classification Search .................. 137/891, 137/892, 219, 894; 123/568.17, 568.18; 251/129.11
See application file for complete search history.

(56) References Cited

U.S. PATENT DOCUMENTS

| | | | | |
|---|---|---|---|---|
| 2,240,119 A * | 4/1941 | Montgomery et al. | ....... | 251/250 |
| 2,794,447 A | 6/1957 | Spitz | .......................... | 261/50.1 |
| 3,473,481 A * | 10/1969 | Brane | .......................... | 417/189 |
| 3,529,619 A | 9/1970 | Drewry et al. | ............... | 137/219 |
| 3,996,748 A | 12/1976 | Melchior | ...................... | 60/614 |
| 4,331,173 A | 5/1982 | Culaud | .......................... | 137/219 |
| 4,722,363 A * | 2/1988 | Allyn | .......................... | 137/892 |
| 4,763,874 A * | 8/1988 | Ogawa | .......................... | 251/122 |
| 4,860,795 A * | 8/1989 | Oten | ............................ | 138/46 |
| 4,948,091 A * | 8/1990 | Satoh et al. | ............. | 251/129.11 |

(Continued)

FOREIGN PATENT DOCUMENTS

EP  1 020 632  7/2000

(Continued)

*Primary Examiner*—Stephen M Hepperle
(74) *Attorney, Agent, or Firm*—St. Onge Steward Johnston & Reens LLC (57) ABSTRACT

A system for mixing a first gas flow and a second gas flow includes a conduit defined by a wall for communicating the first gas flow therethrough, an inlet passing through the wall of the conduit for introducing the second gas flow into the conduit, and a valve body disposed within the conduit, the valve body being displaceable in a longitudinal direction with respect to the conduit at the inlet. The conduit includes a bend downstream of the body with respect to a direction of the mixed gas flow. A holder is operably connected at a first end thereof to a downstream end of the valve body, the holder passing through a bore in the wall of the conduit at the bend. An actuator is operably connected to a second end of the holder, the actuator causing, via the holder, the valve body to be displaced in the longitudinal direction.

25 Claims, 8 Drawing Sheets

U.S. PATENT DOCUMENTS

| | | | |
|---|---|---|---|
| 5,611,204 A | 3/1997 | Radovanovic et al. | 60/605.2 |
| 5,765,758 A * | 6/1998 | Chu | 239/369 |
| 6,029,691 A | 2/2000 | Tavor | 137/219 |
| 6,044,827 A * | 4/2000 | Pfaff et al. | 123/568.18 |
| 7,036,529 B2 * | 5/2006 | Berggren et al. | 137/892 |

FOREIGN PATENT DOCUMENTS

| | | |
|---|---|---|
| SE | 512 727 | 5/2000 |

* cited by examiner

ARRANGEMENT FOR MIXING A FIRST AND SECOND GAS FLOW WITH DOWNSTREAM CONTROL

RELATED APPLICATIONS

This patent application is a continuation-in-part of U.S. patent application Ser. No. 10/363,350, filed Jul. 7, 2003, now issued as U.S. Pat. No. 7,036,529.

FIELD OF THE INVENTION

The present invention relates generally to a system for mixing a first gas flow and a second gas flow, and more particularly to an exhaust gas recirculation system for mixing air and recirculating exhaust gas for use in connection with an internal combustion engine.

BACKGROUND OF THE INVENTION

As a result of expected stricter legislation concerning the levels of nitrogen oxides (NOx) in exhaust gases from various types of internal combustion engines, extensive development is currently being carried out throughout the world to produce a system for the cleaning of exhaust gases and the reduction of the NOx levels. Many solutions have been proposed, many of which provide some level of improvement over previously known systems and methods, particularly when used in conjunction with relatively simple engine configurations.

However, the situation with respect to exhaust gas cleaning technology is much more complex where turbocharged engines (such as turbocharged diesel engines) with heavy operating conditions are concerned. Furthermore, these engines have a different operating cycle with higher loads during certification. Several solutions have been suggested, including expensive catalysis processes including several subprocesses (for example, injection of water, addition of urea) that in addition involve disadvantages in the form of complex and space-demanding components. The EGR (exhaust gas recirculation) concept, which has long been applied for lighter diesel engines in passenger cars, has attracted interest since it not only has advantages from the point of view of expense but also is expected to offer safe functioning and simple and compact construction, among other benefits.

During the turbocharging of heavy diesel engines that takes place when in operation, the pressure of the exhaust gases in most cases lies under the inlet pressure, and exhaust gases can therefore not be recirculated without measures being taken for achieving a supply of exhaust gases, in the form of, for example, venturi solutions, exhaust throttles or inlet throttles. However, these solutions have up until now been associated with disadvantages in the form of, for example, reduced engine power through high pressure losses, together with increased fuel consumption and smoke development.

By placing a venturi in the inlet flow, an advantageous difference in pressure between the exhaust and the inlet channel is achieved, and exhaust gases, which are removed upstream of the turbo, can be fed into the inlet pipe of the engine. A reduced NOx level is obtained as a result of the resulting lower combustion temperature.

U.S. Pat. No. 5,333,456 (Carter) discloses a flow valve in the shape of a coil that is placed upstream in the EGR supply flow. This control valve, however, can not be used in the inlet channels of turbocharged engines, as a result of its design and other considerations.

U.S. Pat. No. 5,611,204 (Cummins) discloses a flow regulator with venturi function, placed, however, in the inlet channel adjacent to the EGR supply flow. The opening for supply of exhaust gases is not located where the throttling of fresh air is greatest, which would involve a more severe throttling than necessary, while the total pressure losses, which arise from, for example, the neighboring actuating means, become significant.

The publication SAE 2000 World Congress, SAE Technical Paper Series 2000-01-0225 discloses a variable venturi with axial EGR supply. The design does not display a proper venturi shape since the fresh air is exposed to a momentary increase in area at the end of the injector pipe, and the pressure losses that follow from this design. The component must be equipped with an elbow, with its associated pressure losses, as a result of the axial supply, and furthermore, the fact that the dimensions of the component are unnecessarily bulky must also be considered. The arrangement is primarily intended for measurement purposes and has no interest with respect to normal operating conditions.

The disadvantages of the above-described prior art systems have been obviated by U.S. patent application Ser. No. 10/363,350, parent to the present application, in which is disclosed a flow regulator for EGR systems in the form of a variable venturi intended for mounting in the inlet part of turbocharged engines. The flow regulator includes a pipe section with a radial EGR supply flow and an essentially freely suspended body therein. The body can be displaced in the direction of the flow and is preferably designed such that the instantaneous throttling of fresh air is always greatest in the immediate vicinity of the inlet for supply of exhaust gases, independently of the position of the body. The throttling varies optimally during the regulation as a consequence of the variation with respect to the flow area of fresh air between the body and the wall of the pipe during supply of exhaust gases. In this way, the varying requirement for pumping is satisfied, with a minimum of pressure losses.

According to U.S. patent application Ser. No. 10/363,350, the venturi effect is principally achieved through the design of the streamlined body, and can in particular cases, be supplemented with a fixed venturi part, the diameter of which is either greater than or less than the greatest diameter of the drop section. An outlet cone (diffuser) can be incorporated with the rear part of the pipe section, as necessary, which makes its mounting possible in inlet channels with varying dimensions. According to one preferred embodiment, the body is controlled by an actuating means that is integrated with the body or that is arranged outside of the pipeline and connected to a front portion of the body. The first flow is not disturbed by such an actuating means, nor are any pressure losses caused. Furthermore, such a design can be produced considerably robust, compact, and displaying minimal external dimensions. The properties of the body, its location in the inlet channel and the actuating means allow a minimal disturbance of the supply of air to be achieved, and very good regulation is achieved with thorough mixing of the air supply for varying loads on the engine.

While the flow regulator disclosed in U.S. patent application Ser. No. 10/363,350 provides excellent results, and can be used in engines having a myriad of configurations, it has been discovered that in particular situations and in connection with engine systems having certain configurations, modifications to the flow regulator may be desirable. For example, the use of intercoolers in turbocharged engines has become common, which intercoolers are often large and consume a significant amount of space within the engine cavity. As such, space may become a concern. Moreover, the output port on the intercooler (or some other component to which the flow regulator is to be attached) and the input port on the engine manifold may be positioned such that a bend (of ninety degrees or some other angle) in the outlet conduit between the flow regulator and the engine manifold may be required. The Applicants of the present invention have discovered that such situations provide the opportunity for a beneficial modification of the flow regulator disclosed in U.S. patent application Ser. No. 10/363,350.

What is desired, therefore, is a system for mixing a first and a second gas flow which optimizes the mixing efficiency of the two flows, which minimizes pressure losses when mixing the two flows, which can be used in connection with turbocharged engines, which is compact in design and can be used in applications where space is of concern, and which is particularly adapted for use in applications where a bend in the outlet conduit is necessary or desirable.

SUMMARY OF THE INVENTION

Accordingly, it is an object of the present invention to provide a system for mixing a first and a second gas flow which optimizes the mixing efficiency of the two flows.

Another object of the present invention is to provide a system for mixing a first and a second gas flow having the above characteristics and which minimizes pressure losses when mixing the two flows.

A further object of the present invention is to provide a system for mixing a first and a second gas flow having the above characteristics and which can be used in connection with turbocharged engines.

Still another object of the present invention is to provide a system for mixing a first and a second gas flow having the above characteristics and which is compact in design and can be used in applications where space is of concern.

Yet a further object of the present invention is to provide a system for mixing a first and a second gas flow having the above characteristics and which is particularly adapted for use in applications where a bend in the outlet conduit is necessary or desirable.

These and other objects are achieved in accordance with one embodiment of the present invention by provision of an exhaust gas recirculation system including a conduit defined by a wall for communicating air therethrough, an inlet passing through the wall of the conduit for introducing recirculating exhaust gas into the conduit and a valve body disposed within the conduit, the valve body being displaceable in a longitudinal direction with respect to the conduit at the inlet in order to at least partly occlude the inlet and to vary the extent of occlusion of the inlet in order to regulate flow of the recirculating exhaust gas into the conduit, thereby regulating a proportion of the air and the recirculating exhaust gas in a resulting mixed gas flow, wherein an active diffuser region is created within the conduit downstream of the inlet. The conduit includes a bend downstream of the body with respect to a direction of the mixed gas flow, and the bend in the conduit begins in the vicinity of the active diffuser region. A substantially straight, substantially rigid holder is operably connected at a first end thereof to a downstream end of the valve body, the holder passing through a bore in the wall of the conduit at the bend. An actuator is operably connected to a second end of the holder, the actuator causing, via the holder, the valve body to be displaced in the longitudinal direction.

In some embodiments, the valve body is freely suspended within the conduit substantially only by the holder. In some embodiments, the bend has an angle falling within a range of from about 30 degrees to about 90 degrees. In certain of these embodiments, the bend has an angle of about 45 degrees. In certain embodiments, the bend has an angle of about 90 degrees. In some embodiments, the holder comprises a rod that slides within the bore in the wall of the conduit at the bend, and the actuator provides reciprocal back-and-forth motion to the holder. In some embodiments, the holder is threaded or configured as a ball screw cooperating with mating threads provided in the valve body or the bore in the wall of the conduit at the bend, and the actuator provides rotating motion to the holder.

In some embodiments, the actuator comprises at least one of the following: a hydraulic actuator, a pneumatic actuator and an electromechanical actuator. In some embodiments, the valve body comprises a streamlined body so configured as to achieve a variable venturi effect and in this way a variable suction effect and mixture of the mixed gas flow, and to achieve maximal throttling in the conduit in close proximity to the inlet independently of a position of the streamlined body, in order to minimize the need for throttling and accompanying pressure losses. In some embodiments, the inlet is arranged around a cross-section of the conduit in order to maximize suction effect and in this way minimize pressure losses. In some embodiments, the conduit includes a second bend downstream of the body with respect to a direction of the mixed gas flow.

In accordance with another embodiment of the present invention, a system for mixing a first gas flow and a second gas flow includes a conduit defined by a wall for communicating the first gas flow therethrough, an inlet passing through the wall of the conduit for introducing the second gas flow into the conduit, and a valve body disposed within the conduit, the valve body being displaceable in a longitudinal direction with respect to the conduit at the inlet in order to at least partly occlude the inlet and to vary the extent of occlusion of the inlet in order to regulate flow of the second gas flow into the conduit, thereby regulating a proportion of the first gas flow and the second gas flow in a resulting mixed gas flow. The conduit includes a bend downstream of the body with respect to a direction of the mixed gas flow. A holder is operably connected at a first end thereof to a downstream end of the valve body, the holder passing through a bore in the wall of the conduit at the bend. An actuator is operably connected to a second end of the holder, the actuator causing, via the holder, the valve body to be displaced in the longitudinal direction.

In some embodiments, an active diffuser region is created within the conduit downstream of the inlet, and the bend in the conduit begins in the vicinity of the active diffuser region. In some embodiments, the valve body is freely suspended within the conduit substantially only by the holder. In some embodiments, the bend has an angle falling within a range of from about 30 degrees to about 90 degrees. In certain of these embodiments, the bend has an angle of about 45 degrees. In certain embodiments, the bend has an angle of about 90 degrees.

In some embodiments, the holder comprises a substantially straight, substantially rigid holder. In certain of these embodiments, the holder comprises a rod that slides within the bore in the wall of the conduit at the bend, and the actuator provides reciprocal back-and-forth motion to the holder. In certain embodiments, the holder is threaded or configured as a ball screw cooperating with mating threads provided in the valve body or the bore in the wall of the conduit at the bend, and the actuator provides rotating motion to the holder.

In some embodiments, the actuator comprises at least one of the following: a hydraulic actuator, a pneumatic actuator and an electromechanical actuator. In some embodiments, the valve body comprises a streamlined body so configured as to achieve a variable venturi effect and in this way a variable suction effect and mixture of the mixed gas flow, and to achieve maximal throttling in the conduit in close proximity to the inlet independently of a position of the streamlined body, in order to minimize the need for throttling and accompanying pressure losses. In some embodiments, the inlet is arranged around a cross-section of the conduit in order to maximize suction effect and in this way minimize pressure losses. In some embodiments, the conduit includes a second bend downstream of the body with respect to a direction of the mixed gas flow. In some embodiments, the first gas flow comprises air and the second gas flow comprises recirculating exhaust gas.

The invention and its particular features and advantages will become more apparent from the following detailed description considered with reference to the accompanying drawings.

DETAILED DESCRIPTION OF AN EMBODIMENT OF THE INVENTION

Exemplary embodiments of the invention will be described in the following text as preferred embodiments in association with exhaust gas recirculation of a turbocharged engine. The invention, however, is not limited to this application, but can be used in many different applications where two gas flows are to be mixed. One example is oxygen-enrichment, that is, supply of oxygen to another gas. The area of application can in this case be, for example, refuse combustion plants.

In the preferred application, an EGR supply flow is introduced radially via a supply part 2 in an inlet channel or pipeline generally denoted by 16 from a turbocharger that is not shown. The supply part 2 is inserted between flanges 1,1' of a pair of pipe sections 13 and 13' in the line 16. The supply part 2 forms a flow regulator together with the streamlined body 8 described below. On the basis of the designs of the streamlined body 8 and the supply part 2, the greatest throttling of fresh air is always achieved at the gap 3 for exhaust gas introduction, independently of the position of the body 8. In the embodiment shown, the supply part 2 is designed with a cross-sectional area that decreases up to the slit in the direction of flow in the line 16 for this purpose. This reduction in the cross-sectional area of the supply part 2 is, furthermore, greater than the reduction in the cross-sectional area of the streamlined body 8 downstream of its greatest cross-sectional area in the direction of flow in the line 16. In the active diffuser region downstream of the slit 3, the pipeline 16 has, in the embodiment shown, a constant cross-sectional area, while the cross-sectional area of the streamlined body 8 continues to decrease in this region. The actuating means 20 is arranged such that the greatest cross-sectional area of the streamlined body 8 is never displaced downstream of the slit 3. The ring-shaped channel that is limited between the supply part 2 and the streamlined body 8 thus always has a convergent course in the direction of flow up to the slit 3 and a divergent course after the slit 3 independently of the position of the body 8.

Supply flow preferably occurs via a continuous circular slit 3 through the supply part 2, which in this case is in two parts, but it can also be achieved via a number of holes or slits around the perimeter (not shown).

Even if the supply occurs radially, the direction of the supply at the inlet 7 of the supply part 2 can be selected to lie at such an angle that the desired flow conditions and the least possible flow losses can be achieved when mixing the two gases.

By maximizing the throttling of fresh air at the inlet of exhaust gases 3 according to the invention, the greatest possible pump effect is also achieved, that is, the solution involves very small pressure losses. As a consequence of the free flow of air around the present streamlined body 8, which displays a venturi effect in itself, deterioration of the power of the engine is avoided in the same way while good regulation of the EGR supply is achieved.

A continuous, cylindrical cavity 4 exists around the gap 3. A gasket 6 is placed between the two parts of the supply part 2. The desired gap distance in the opening 3 can be achieved by selecting the thickness of the gasket 6. A supply pipe for the EGR supply flow can be mounted in a manner that is not shown at the inlet 7 of the supply part 2 from an extension of a manifold for the exit exhaust gases of the engine.

The input air is cooled in the conventional manner downstream of the turbocharger by an intercooler that is not shown in FIGS. 1-5, and the EGR gases are cooled in the same way via a separate EGR cooler before supply into the inlet channel. The flow regulator can be placed at a freely chosen location downstream of the turbocharger. However, the flow regulator is preferably located downstream of the intercooler to prevent the latter being contaminated with soot or being corroded by the acidic exhaust gases.

In the embodiments shown in FIGS. 1-5, the streamlined body 8 is freely suspended within the supply part 2 by means of a holder 12 that extends from the front edge of the body 8 and outwards into the pipe section 16. The actuating means 20 for displacement of the body 8 forwards and backwards relative to the supply part 2 can, according to the invention, be arranged either within the body 8 or outside of the line 16.

Figure 1:
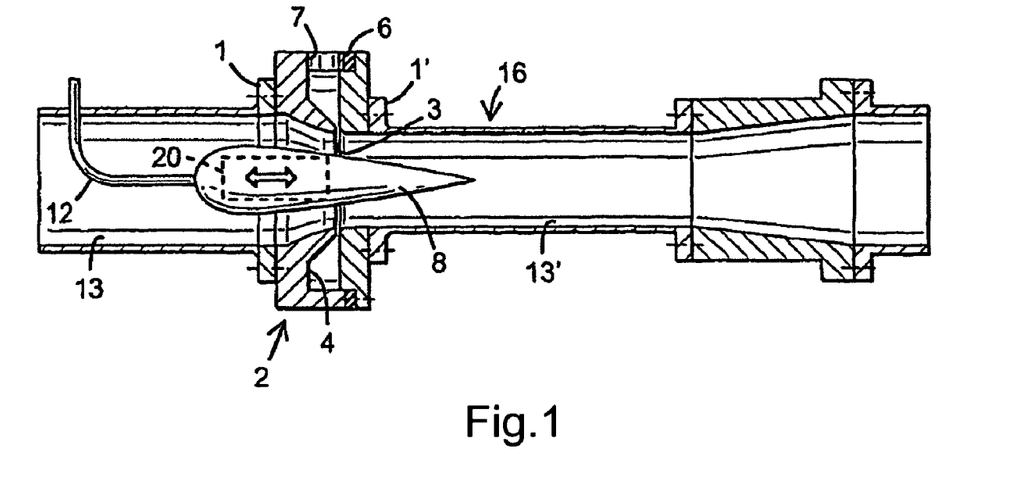
FIG. 1 is a partially cross-sectional view of a flow regulator in accordance with an embodiment of the present invention shown with its associated outlet cone.
Figure 2:
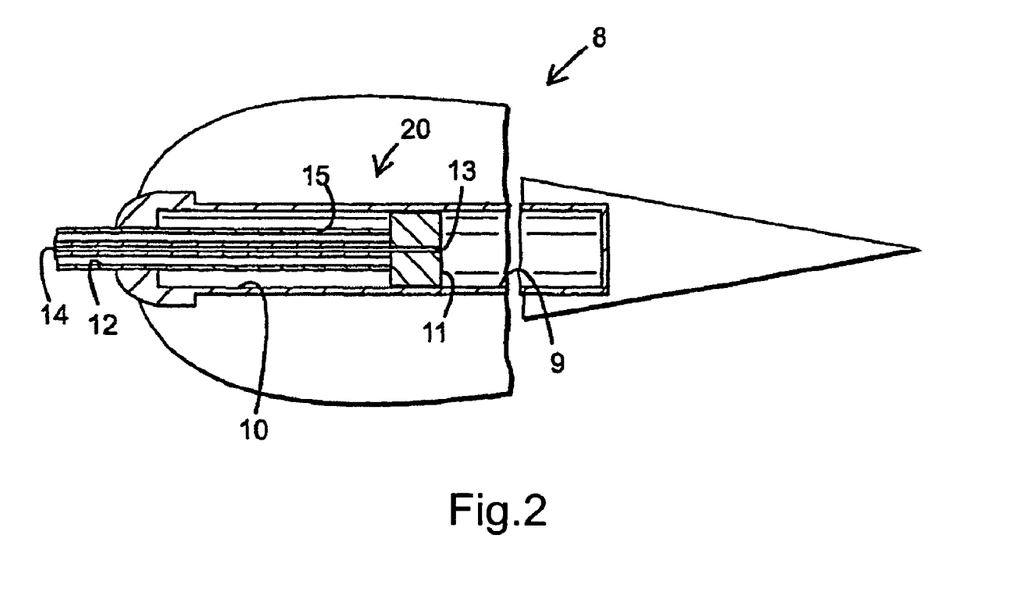
FIG. 2 is a partially cross-sectional view showing in more detail the streamlined body of the flow regulator of FIG. 1 with its integrated fluid-controlled actuating means.

In the embodiment according to FIGS. 1 and 2, the holder 12 is attached to the outer wall of the pipe section 13 and comprises a feed pipe 12 for regulation of the actuating means 20. The actuating means 20 can be regulated by hydraulic means or through a gaseous fluid, preferably pressurized air that is available on commercial vehicles through the braking system. The actuating means is integrated with the body 8, that is, it is located inside of it. At that, a cylinder 9 is placed inside the body, which cylinder 9 exits through a sealing to the feed pipe 12 of the forward portion of the part of the body 8 with greatest cross-sectional area or with least cross-sectional area, preferably the forward external surface of the part with greatest cross-sectional area. The feed pipe 12 contains an additional smaller feed pipe 14. A spring element, not shown, can be attached against the wall of the cylinder 9 that is placed furthest away from the feed pipe, which spring element influences a piston 11 placed at the end of the feed pipe 12. The piston in turn is equipped with a channel 13 opening at one free end of the piston 11. The perimeter hole 10, along the channel part, which can also contain a spring element, not shown, placed between the piston and the wall of the cylinder placed closest to the feed pipe 12, is equipped with an opening 15 into the feed pipe 12 at the second end of the piston. Thus, the streamlined body 8 attached to the cylinder 9 can be displaced forwards and backwards relative to the gap 3 within the supply part 2 by variation of the fluid pressure in, on the one hand, the feed pipe 12 and, on the other hand, the smaller feed pipe 14.

A particularly simple and robust construction of the flow regulator is achieved by integrating the actuating means with the body, as has been shown by the above description.

Figure 3:
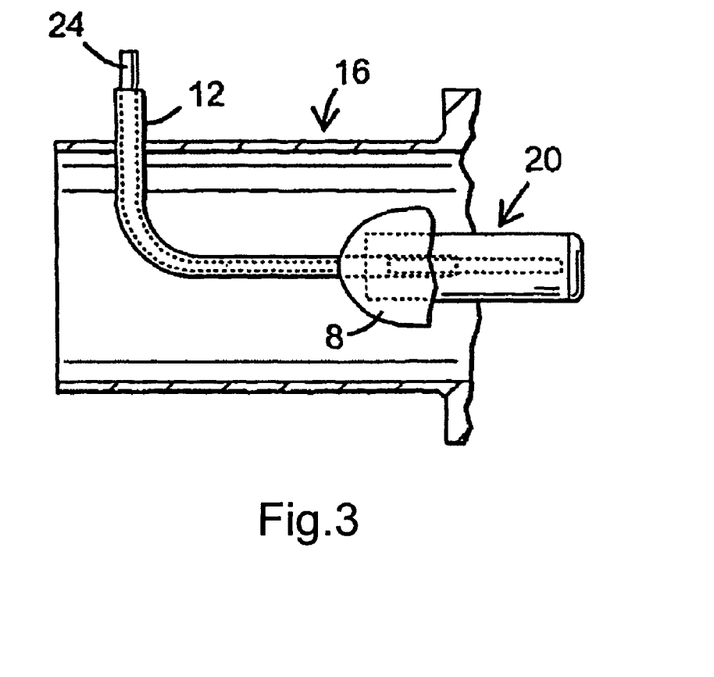
FIG. 3 is a partially cross-sectional view showing in more detail the general design of the streamlined body of the flow regulator of FIG. 1 with integrated actuating means.
Figure 4:
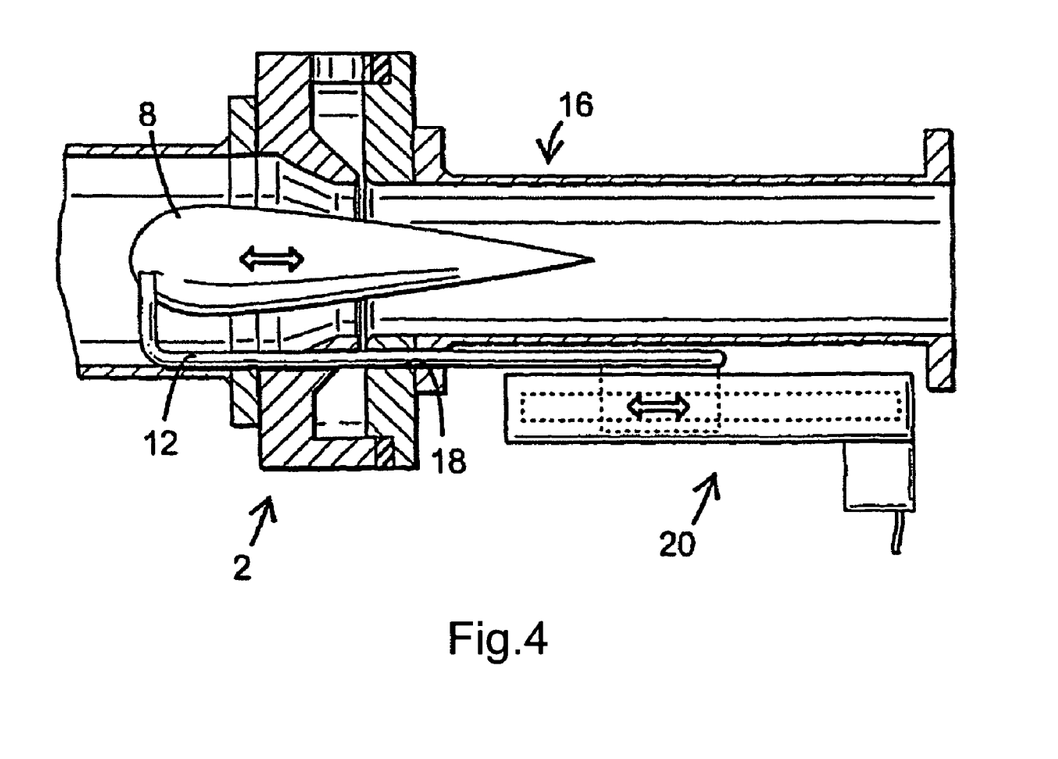
FIG. 4 is a partially cross-sectional view of a flow regulator in accordance with another embodiment of the present invention in which the flow regulator includes an external actuating means.
Figure 5:
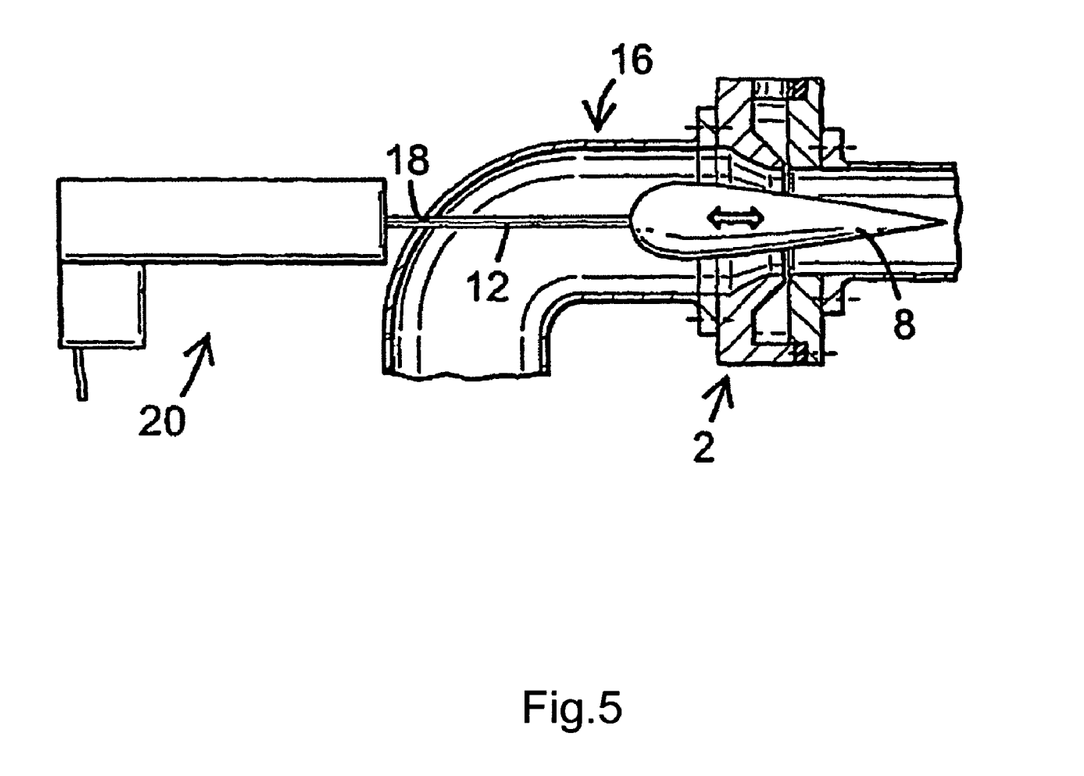
FIG. 5 is a partially cross-sectional view of a flow regulator in accordance with another embodiment of the present invention in which the flow regulator includes an alternative external actuating means.

The actuating means 20 can, as is suggested in FIGS. 3 through 5, be of a general type. The actuating means can be, in addition to hydraulic or pneumatic, electromechanical, with power supply through a cable 24 in the holder 12 (FIG. 3) and an electrical motor or solenoid built into the body. It can also be purely mechanical if, for example, the cable 24 is replaced by a Bowden cable that displaces the body 8 forwards and backwards along the axial section of the holder 12 via an external actuating means 20 against the force of a return spring (not shown) inside the body 8.

Two embodiments of the actuating means placed outside of the line 16 are shown in FIGS. 4 and 5. According to FIG. 4, the holder extends at an angle downstream through a bore 18 in the supply part 2. According to FIG. 5, the holder extends in a straight line through the bore 18, which in this case is located at a bend in the line 16. The holder 12 can be executed as a rod, mounted in bearings to slide in the bore 18. The holder may also be threaded or executed as a ball screw, alternatively having the corresponding inner thread in body 8 or bore 18, whereby only rotating motion needs to be achieved outside of the pipe 16.

That part of the holder 12 that extends across the flow in the line 16 can, as is suggested in FIG. 3, have an extended streamlined cross-section in order to minimize pressure losses in the line 16.

Thus, lower pressure losses in the pipeline arising from the disturbing affects of, for example, an actuating means placed inside the channel are achieved, compared with earlier known designs, through the integrated actuating means or the actuating means placed outside of the pipeline according to the invention.

In contrast to earlier technology, using, among other things, valve-like venturi solutions in the form of a combination of a displaceable coil-formed body and a fixed venturi part, it has been possible to eliminate to a major extent pressure losses in the inlet air according to the present invention.

Referring now to FIGS. 6A through 9B, there is shown an embodiment of the inventive system 110 for mixing a first and a second gas flow in which the actuator 20' is placed outside of the line 16 and downstream of the body 8. System 110 is similar in many ways to the system described above in connection with FIGS. 1-5, and like elements are referenced with like reference numerals. However, system 10 is particularly adapted to be used in applications where a bend 118 in the outlet conduit 13" (i.e., downstream of the body 8) and/or where a compact design is necessary or desirable.

Figure 6A:
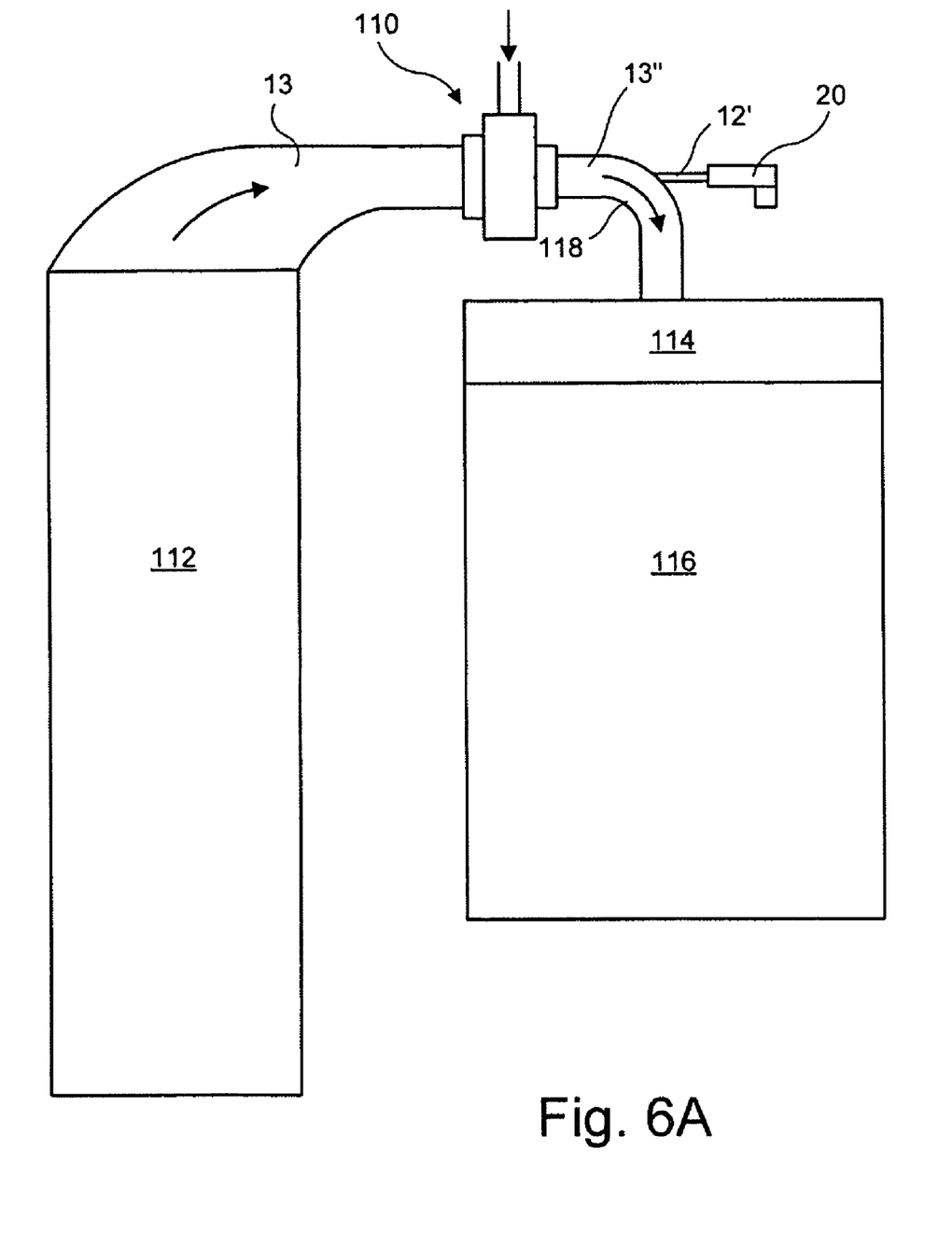
FIGS. 6A through 6C are schematic views of portions of an engine system incorporating a flow regulator in accordance with another embodiment of the present invention in which the flow regulator is actuated from the rear.
Figure 6B:
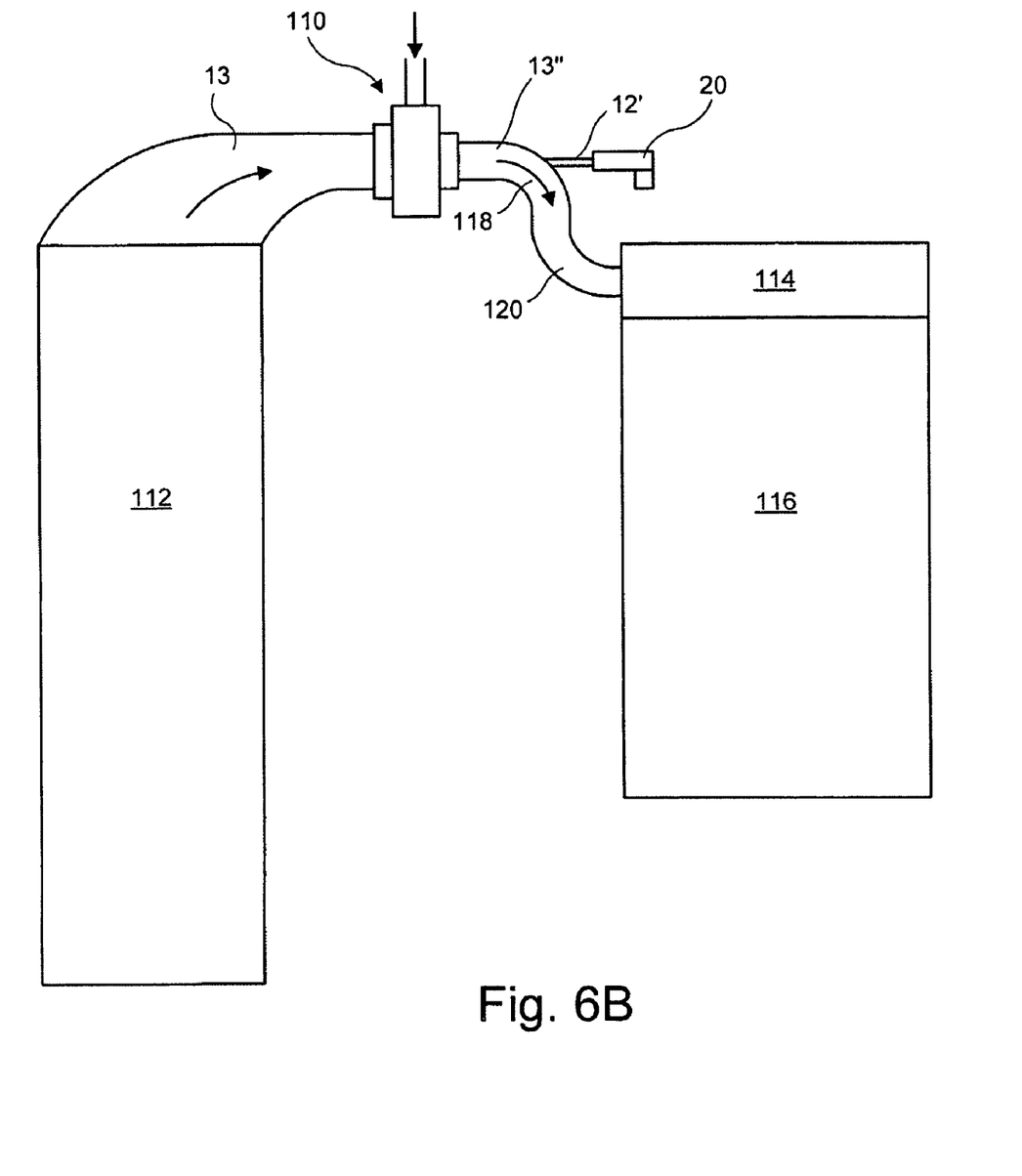
Figure 6C:
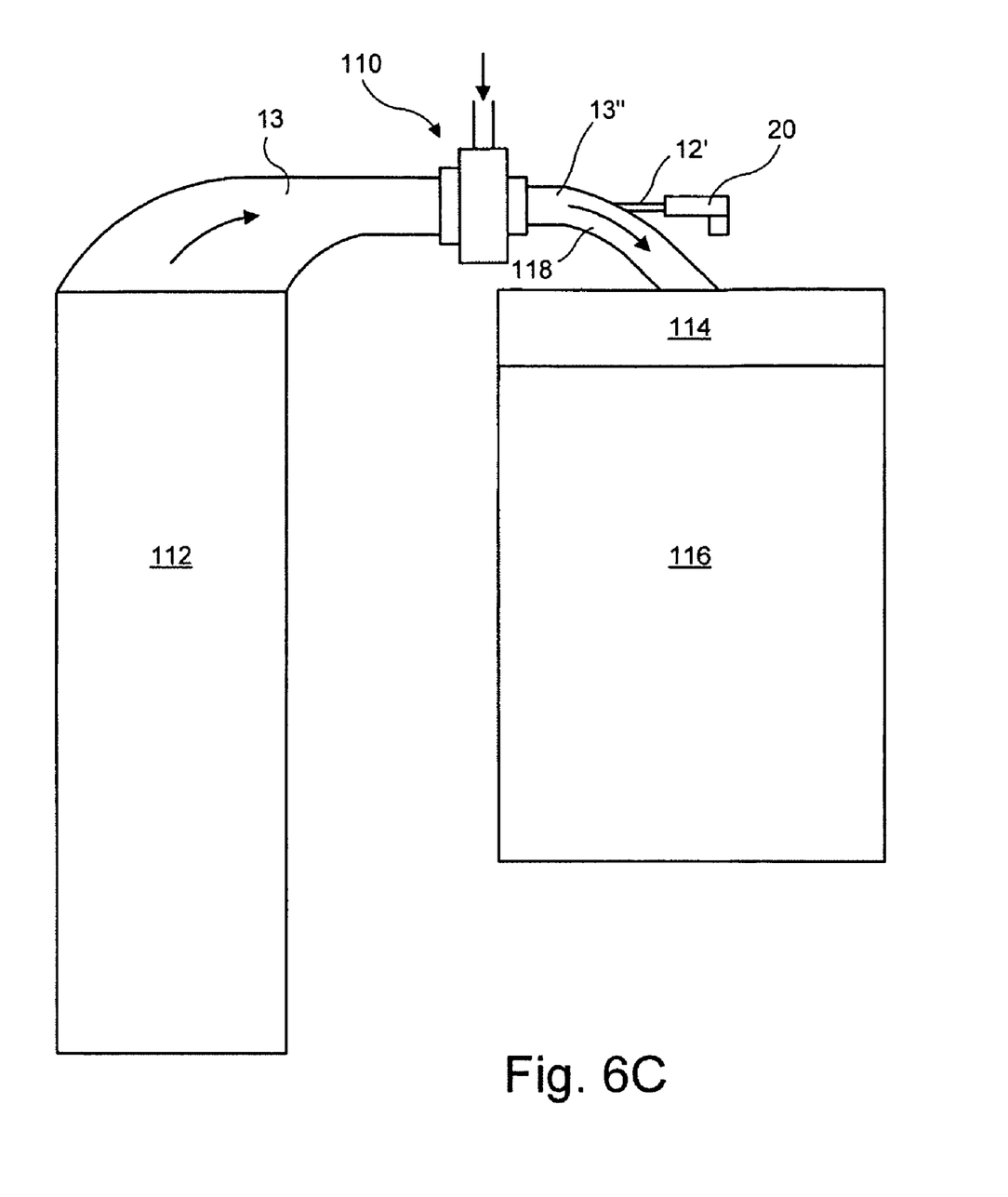

For example, the output port on an intercooler 112 (or some other component to which the flow regulator is to be attached) and the input port on a manifold 114 of an engine 116 may be positioned such that a bend 118 in the outlet conduit 13" between the flow regulator and the engine manifold may be required. The bend 118 may be of various angles, such as 90 degrees (as shown in FIGS. 6A and 6B), 45 degrees (as shown in FIG. 6C), or any other angle. It is preferred that the bend has an angle falling within a range of from about 30 degrees to about 90 degrees. It will be understood by those skilled in the art that the sharper the bend 118, the shorter the required length of holder 12'. If desired, a second bend 120 (shown in FIG. 6B) may be provided in outlet conduit 13" downstream of bend 118.

Referring now to FIGS. 7-10, system 110 is shown in more detail. System 110 is similar in configuration and operation in many respects to the system described above in connection with FIGS. 1-5, and therefore achieves many of the same advantages thereof. The main difference between system 110 and the above-described system, however, is that rather than the streamlined body 8 being freely suspended within the supply part 2 by means of a holder 12 that extends from the front edge of the body 8 and outwards into the pipe section 16, the streamlined body 8 of system 110 is freely suspended within the supply part 2 by means of a holder 12' that extends from the rear (i.e., downstream) end of the body 8, outwards into the downstream conduit 13", and through a bore 18' in the wall of conduit 13" at the bend 118.

Figure 7:
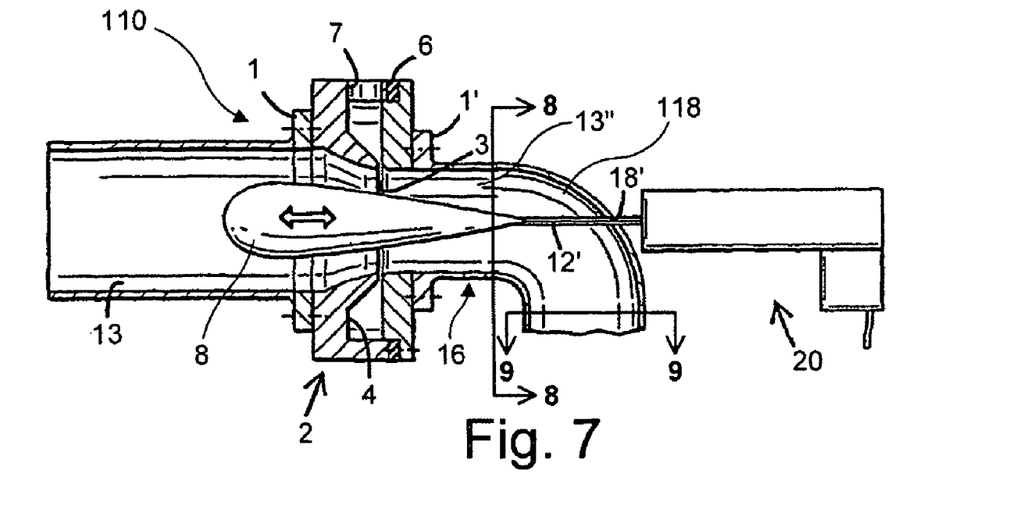
FIG. 7 is a partially cross-sectional view showing in more detail the flow regulator of FIGS. 6A through 6C.
Figure 10:
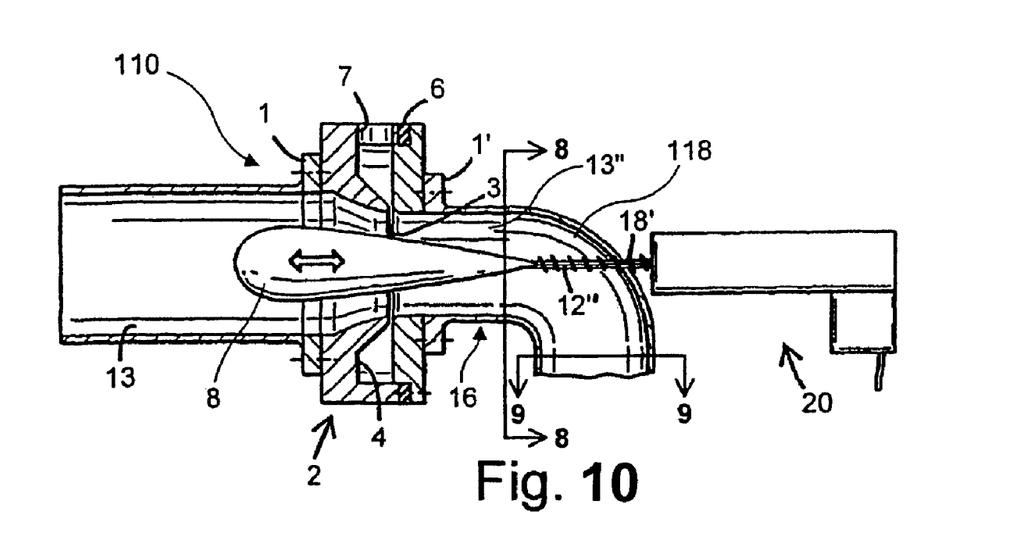
FIG. 10 is a partially cross-sectional view showing in more detail an alternative embodiment of the flow regulator of FIG. 7.

As shown in FIGS. 7 and 10, actuator 20 for displacement of the body 8 forwards and backwards relative to the supply part 2 is preferably arranged outside of the downstream conduit 13", and holder 12', 12" preferably extends in a straight line through the bore 18' in the wall of downstream conduit 13" at the bend 118 and is operably connected to actuator 20. The holder 12' can be configured as a rod, mounted in bearings to slide in the bore 18, in which case the actuator 20 provides reciprocal back-and-forth motion to holder 12' (as shown in FIG. 7). The holder 12" may also be threaded or configured as a ball screw, alternatively having the corresponding inner thread in body 8 or bore 18, whereby only rotating motion needs to be achieved by actuator 20 (as shown in FIG. 10). The actuator 20 can be regulated by hydraulic means, through a gaseous fluid, preferably pressurized air that is available on commercial vehicles through the braking system, and/or through an electromechanical arrangement.

Figure 8A:
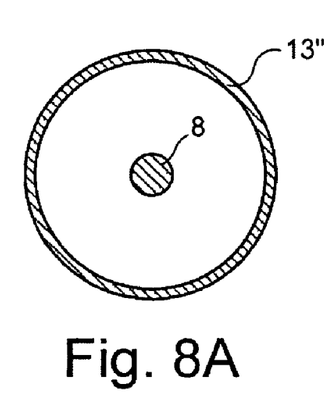
FIGS. 8A and 8B are alternative cross-sectional views taken along line 8-8 of FIG. 7.
Figure 8B:
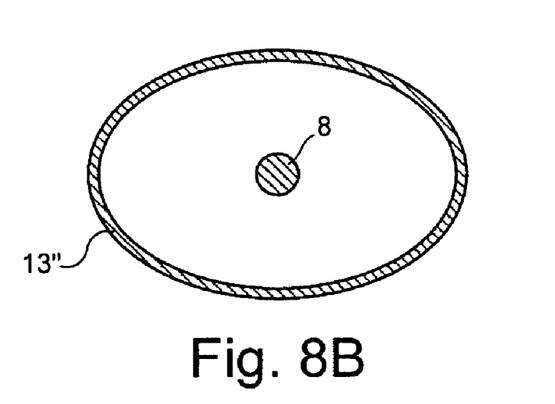
Figure 9A:
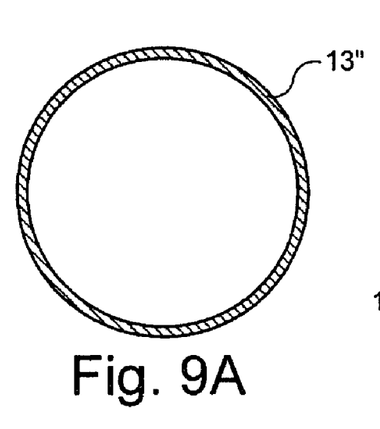
FIGS. 9A and 9B are alternative cross-sectional views taken along line 9-9 of FIG. 7.
Figure 9B:
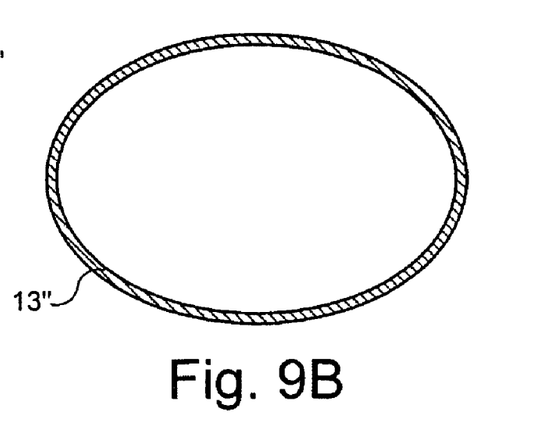

As discussed in more detail above, an active diffuser region is created downstream of the slit 3, as the cross-sectional area of the streamlined body 8 continues to decrease in this area. As shown in FIGS. 7 and 10, it is preferable that the bend 118 starts (i.e., the downstream conduit 13" begins to bend) in the vicinity of this active diffuser region. More specifically, the bend 118 starts at the imaginary line 8-8 in FIGS. 7 and 10. As seen in FIGS. 8A and 8B (which are cross-sectional views taken along imaginary line 8-8), the streamlined body is configured and positioned so as to cross this imaginary line 8-8 where bend 118 starts.

Also as shown in FIGS. 8A and 8B, downstream conduit 13" may be generally circular (shown in FIG. 8A) or may be of some other cross-sectional shape, such as being generally elliptical (shown in FIG. 8B) in cross-section. As downstream conduit 13" continues, it may remain constant in cross-section. Alternatively, downstream conduit 13" may change in size, for example, having a generally circular cross-section of one size (shown in FIG. 8A) and later having a generally circular cross-section of a larger size (shown in FIG. 9A), or having a generally elliptical cross-section of one size (shown in FIG. 8B) and later having a generally elliptical cross-section of a larger size (shown in FIG. 9B). Downstream conduit 13" may also change in cross-sectional shape, for example, having a generally circular cross-section (shown in FIG. 8A) and later having a generally elliptical cross-section (shown in FIG. 9B), or having a generally elliptical cross-section (shown in FIG. 8B) and later having a generally circular cross-section (shown in FIG. 9A).

The present invention, therefore, provides a system for mixing a first and a second gas flow which optimizes the mixing efficiency of the two flows, which minimizes pressure losses when mixing the two flows, which can be used in connection with turbocharged engines, which is compact in design and can be used in applications where space is of concern, and which is particularly adapted for use in applications where a bend in the outlet conduit is necessary or desirable.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An exhaust gas recirculation system comprising:
   a conduit defined by a wall for communicating air therethrough;
   an inlet passing through the wall of said conduit for introducing recirculating exhaust gas into said conduit;
   a valve body disposed within said conduit, said valve body being displaceable in a longitudinal direction with respect to said conduit at the inlet, and penetrating a plane lying on a longitudinal axis of the inlet and perpendicular to a longitudinal axis of the conduit at the inlet, in order to at least partly occlude said inlet and to vary the extent of occlusion of said inlet in order to regulate flow of the recirculating exhaust gas into said conduit, thereby regulating a proportion of the air and the recirculating exhaust gas in a resulting mixed gas flow, wherein an active diffuser region is created within said conduit downstream of said inlet, wherein the valve body and the conduit define a venturi therebetween, and wherein the conduit has a cross-sectional area that decreases in the direction of flow in the conduit up to the inlet, such that the venturi has a throat proximate to the inlet independently of the position of the valve body whereby throttling of the air is greatest at the inlet independently of a position of said valve body;
   wherein said conduit includes a bend downstream of the body with respect to a direction of the mixed gas flow, and wherein the bend in said conduit begins in the vicinity of the active diffuser region;
   a substantially straight, substantially rigid holder operably connected at a first end thereof to a downstream end of said valve body, said holder passing through a bore in the wall of the conduit at the bend; and
   an actuator operably connected to a second end of the holder, said actuator causing, via said holder, said valve body to be displaced in the longitudinal direction.

2. The system of claim 1 wherein said valve body is freely suspended within said conduit substantially only by said holder.

3. The system of claim 1 wherein the bend has an angle falling within a range of from about 30 degrees to about 90 degrees.

4. The system of claim 3 wherein the bend has an angle of about 45 degrees.

5. The system of claim 3 wherein the bend has an angle of about 90 degrees.

6. The system of claim 1 wherein said holder comprises a rod that slides within the bore in the wall of the conduit at the bend, and wherein said actuator provides reciprocal back-and-forth motion to said holder.

7. The system of claim 1 wherein said holder is threaded or configured as a ball screw cooperating with mating threads provided in said valve body or the bore in the wall of the conduit at the bend, and wherein said actuator provides rotating motion to said holder.

8. The system of claim 1 wherein said actuator comprises at least one of the following: a hydraulic actuator, a pneumatic actuator and an electromechanical actuator.

9. The system of claim 1 wherein said valve body comprises a streamlined body so configured as to achieve a variable venturi effect and in this way a variable suction effect and mixture of the mixed gas flow, and to achieve maximal throttling in said conduit in close proximity to said inlet independently of a position of the streamlined body, in order to minimize the need for throttling and accompanying pressure losses.

10. The system of claim 1 wherein said inlet is arranged around a cross-section of said conduit in order to maximize suction effect and in this way minimize pressure losses.

11. The system of claim 1 wherein said conduit includes a second bend downstream of the body with respect to a direction of the mixed gas flow.

12. A system for mixing a first gas flow and a second gas flow, said system comprising:
   a conduit defined by a wall for communicating the first gas flow therethrough;
   an inlet passing through the wall of said conduit for introducing the second gas flow into said conduit;
   a valve body disposed within said conduit, said valve body being displaceable in a longitudinal direction with respect to said conduit at the inlet, and penetrating a plane lying on a longitudinal axis of the inlet and perpendicular to a longitudinal axis of the conduit at the inlet, in order to at least partly occlude said inlet and to vary the extent of occlusion of said inlet in order to regulate flow of the second gas flow into said conduit, thereby regulating a proportion of the first gas flow and the second gas flow in a resulting mixed gas flow, wherein the valve body and the conduit define a venturi therebetween, and wherein the conduit has a cross-sectional area that decreases in the direction of flow in the conduit up to the inlet, such that the venturi has a throat proximate to the inlet independently of the position of the valve body whereby throttling of the first as flow is greatest at the inlet independently of a position of said valve body;
   wherein said conduit includes a bend downstream of the body with respect to a direction of the mixed gas flow;
   a holder operably connected at a first end thereof to a downstream end of said valve body, said holder passing through a bore in the wall of the conduit at the bend; and
   an actuator operably connected to a second end of the holder, said actuator causing, via said holder, said valve body to be displaced in the longitudinal direction.

13. The system of claim 12 wherein an active diffuser region is created within said conduit downstream of said inlet, and wherein the bend in said conduit begins in the vicinity of the active diffuser region.

14. The system of claim 12 wherein said valve body is freely suspended within said conduit substantially only by said holder.

15. The system of claim 12 wherein the bend has an angle falling within a range of from about 30 degrees to about 90 degrees.

16. The system of claim 15 wherein the bend has an angle of about 45 degrees.

17. The system of claim 15 wherein the bend has an angle of about 90 degrees.

18. The system of claim 12 wherein said holder comprises a substantially straight, substantially rigid holder.

19. The system of claim 18 wherein said holder comprises a rod that slides within the bore in the wall of the conduit at the bend, and wherein said actuator provides reciprocal back-and-forth motion to said holder.

20. The system of claim 18 wherein said holder is threaded or configured as a ball screw cooperating with mating threads provided in said valve body or the bore in the wall of the conduit at the bend, and wherein said actuator provides rotating motion to said holder.

21. The system of claim 12 wherein said actuator comprises at least one of the following: a hydraulic actuator, a pneumatic actuator and an electromechanical actuator.

22. The system of claim 12 wherein said valve body comprises a streamlined body so configured as to achieve a variable venturi effect and in this way a variable suction effect and mixture of the mixed gas flow, and to achieve maximal throttling in said conduit in close proximity to said inlet independently of a position of the streamlined body, in order to minimize the need for throttling and accompanying pressure losses.

23. The system of claim 12 wherein said inlet is arranged around a cross-section of said conduit in order to maximize suction effect and in this way minimize pressure losses.

24. The system of claim 12 wherein said conduit includes a second bend downstream of the body with respect to a direction of the mixed gas flow.

25. The system of claim 12 wherein said first gas flow comprises air and wherein said second gas flow comprises recirculating exhaust gas.

* * * * *